(12) United States Patent
Sunwoo et al.

(10) Patent No.: US 6,314,129 B1
(45) Date of Patent: Nov. 6, 2001

(54) CIRCUIT AND METHOD FOR TIMING RECOVERY IN DIGITAL COMMUNICATION RECEIVER

(75) Inventors: Myung Hoon Sunwoo, Pungrim Apt. 303-303; Se Young Eun, both of Kyungki-do (KR)

(73) Assignees: Myung Hoon Sunwoo; C&S Technology, both of (KR)

( * ) Notice: Subject to any disclaimer, the term of this patent is extended or adjusted under 35 U.S.C. 154(b) by 0 days.

(21) Appl. No.: 09/195,508

(22) Filed: Nov. 18, 1998

(30) Foreign Application Priority Data

Nov. 20, 1997 (KR) .............................................. 1997/61431

(51) Int. Cl.[7] .............................. H04L 27/30; H04K 1/00
(52) U.S. Cl. ........................................... 375/149; 375/152
(58) Field of Search ..................................... 375/355, 343, 375/145, 143, 149, 147, 152, 367; 370/320, 335, 342

(56) References Cited

U.S. PATENT DOCUMENTS 4,599,732 * 7/1986 LeFever ................................ 375/231
5,504,785 * 4/1996 Becker et al. ........................ 375/344

OTHER PUBLICATIONS

Dick C. et al, "Synchronization in Software Radios–Carrier and Timing Recovery Uing FPGAs," IEEE Symposium on Field Programmable Custom Computing, 2000, pp. 195–204..*

Lambertte et al., "Variable sample rate Digital Feedback NDA Timing Synchronization," GLOBECOM '96 Global Telecom. Conference, pp. 13481352.*

"A Unified Approach to Serial Search Spread Spectrum Code Acquisition—part I: General Theory" by Polydoros et al., IEEE Transactions on Communications, vol. Com–32, No. 5, May 19, 1984, pp. 542–549.

(List continued on next page.)

*Primary Examiner*—Tesfaldet Bocure
(74) *Attorney, Agent, or Firm*—Sheridan Ross P.C.

(57) ABSTRACT

Circuit and method for timing recovery in a digital communication receiver for improving a BER performance and having a faster data transmission rate, the timing recovery circuit for recovering a synchronous timing signal of a PN code from an output of a matched filter in the digital communication receiver, including a power calculation circuit for receiving an output of the matched filter and calculating a power of a PN code signal for each sample period in each symbol period, a maximal power position detection circuit for detecting a sample position at which a symbol period has a maximum power value, a symbol position tracking circuit for tracking and setting an optimal symbol position value, a modulo counter for rotating as many as a number of samples in one symbol period in counting the samples for providing a reference position of samples, and a comparator for comparing the present symbol position value from the symbol position tracking circuit and a count value from the modulo counter, and generating a symbol clock when the present symbol position value and the count value are the same.

6 Claims, 10 Drawing Sheets

OTHER PUBLICATIONS

"A Unified Approach to Serial Search Spread Spectrum Code Acquisition—Part I: General Theory" by Polydoros et al., IEEE Transactions on Communications, vol. Com–32, No. 5, May 19, 1984, pp. 550–560.

"An Introduction to Digital Matched Filters" by Turin, Proceedings of the IEEE, vol. 64, No. 7, Jul. 197?, pp. 1092–1112.

"A High Speed QPSK/OQPSK Digital Burst Modem for LSIC Implementation" by Seki et al., NTT Radio Communication Systems Laboratories, pp. 422–426.

"Timing Recovery Techniques for Digital Cellular Radio with $_{II}$/4–DQPSK Modulation" by Liu et al. Institute of Electronics and Center Telecommunications Research, IEEE, 1992, pp. 0319–0323.

"Fully Digital Joint Phase Recovery Timing Syncronization and Data Demodulation" by Cheng et al., Heice Trans. Commun., vol. E80 B, No. 2, Feb., 1997, pp. 357–365.

"New DQPSK Simultaneous Carrier and Bit–Timing Recovery Coherent for Wireless Broadband Communication Systems", Matsumoto et al., Heice Trans. Commun., vol. E80 B, No. 8, Aug., 1997, pp. 1145–1152.

"QPSK Carrier abd Bit–Timing Simultaneous Recovery Scheme for Coherrent Demodulation" by Nagura et al., NTT Wireless Systems Laboratories, IEEE, 1995.

* cited by examiner

CIRCUIT AND METHOD FOR TIMING RECOVERY IN DIGITAL COMMUNICATION RECEIVER

BACKGROUND OF THE INVENTION

1. Field of the Invention

The present invention relates to circuit and method for timing recovery in a digital communication receiver of a direct sequence spread spectrum(DSSS) type in which a period of symbol transmitted from a transmitter is predicted for tracking a position of a despread symbol in samples from each period.

2. Background of the Related Art

In a direct sequence/code division multiple access(DS/CDMA) system, a data is directly spread by means of a PN(Pseudo Noise) code before transmission, and a receiver generates a PN code having the same phase with a phase of a transmitter PN code to despread a received, spread spectrum signal, for recovering the received signal. Current analog mobile communication system of which subscriber capacity has been saturated is under replacement with a digital mobile communication system, because the DS/CDMA system allows a high security of communication as detecting of presence of signal is difficult and, even if the presence of signal is known, recovering of an exact signal without knowing the PN code is difficult, and because detection of desired signal only is possible, which allows multiple access and a large subscriber capacity, even if the same carriers are used in signal transmission and reception as users use their own PN codes. However, the DS/CDMA system has to have a PN synchronization for matching phases of the PN codes in the transmitter and the receiver, for which a symbol timing recovery circuit is provided to the receiver.

In the symbol timing recovery circuits, there are an open-loop synchronizer and a closed-loop synchronizer. FIG. 1 illustrates a related art symbol timing recovery circuit of an open-loop synchroniser in a digital communication receiver.

Referring to FIG. 1, the related art symbol timing recovery circuit of an open-loop synchroniser in a digital communication receiver is provided with a power calculation circuit 11 for calculating an output of the matched filter 10 to provide a power signal, a threshold circuit 12 for comparing an output of the power calculating circuit 11 with a preset threshold value to generate pulses when the output exceeds the threshold value, a band pass filter(BPF)13 for filtering an output of the threshold circuit 12, and a zero detection circuit 14 for detecting a zero crossing of a signal from the band pass filter 13 to provide a symbol clock, so that an output of the zero detection circuit 14 drives a sampler 15 and a baseband demodulator 16, in the receiver synchronizing circuit, for providing a sustained signal s(n), which sustains a symbol value selected as a symbol from samples from the matched filter 10 for a symbol period, and a signal d(n) demodulated by the base band demodulator 16. The matched filer 10 may be a correlator of a tapped-delay type or an integrated-dump type having a PN code stored in a shift register. Explanation of the related art hereafter is based on the correlator of a tapped-delay type. FIG. 2 illustrates a power signal $m_p(k)$ from the power calculation circuit 11, which calculates an output of the matched filter 10 into power without noise, wherein a number of samples per symbol can be expressed as C×K(=S), where C denotes a number of PN code chips per symbol and K denotes a number of samples per chip. In general, a function of the timing recovery circuit in the spread spectrum system is extractions from a received signal, of C×K, a symbol period, and a despread value from a C×K number of samples in each symbol period, i.e., a sample period more or less having a maximal power, as the power will be maximum when the PN codes both in the receiver, and transmitter sides are synchronized.

FIGS. 3a~3c illustrate waveforms at different output terminals of 11~15 shown in FIG. 1 for explaining the operation of the open-loop type synchronizer.

Referring to FIG. 3a, the power calculation circuit 11 uses an output m(k) of the matched filter 10 in calculating power $m_p(k)$ in each sample period. In this instance, of the power signals $m_p(k)$, a maximal power of a third symbol is below the threshold value due to degradation of an output of the matched filter 10 caused by a noise. The threshold circuit 12 receives a power of each sample period, compares to a preset threshold value, and provides a high level signal when the power exceeds the threshold value. Therefore, since the third symbol has a maximal power value below the threshold value, no high level signal is provided. Then, as shown in FIG. 3c, the BPF 13 filters outputs of the threshold circuit 12 and provides a high level output at a position of a symbol period which does not exceed the threshold value using a proximate symbol period known in the receiver. Then, as shown in FIG. 3d, the zero detection circuit 14 detects a zero crossing from outputs of the BPF 13 and provides a symbol clock to the sampler 15 and the demodulator 16 as a symbol timing, thereby making a PN synchronization of the phases of codes of the transmitter and the receiver.

And, referring to FIG. 4, in a timing recovery circuit in a digital communication receiver provided with a matched filter for received signal r(k) from a transmitter and correlating the received signal r(k) with a PN code delayed for a sample interval, an on sampler 21 for sampling an output m(k) of the matched filter 20, and a demodulator 22 for demodulating an output s(n) of the on sampler 21, for detecting a sample period which has a maximal power value from a symbol from the matched filter and for setting as a driving timing for the on sampler 21 and the demodulator 22, the related art closed-loop synchronizer is provided with a power calculation circuit 23 for receiving an output m(k) of the matched filter 20 and calculating a power, an early sampler 24 operative at a sample period earlier than the on sampler 21 for receiving an output $m_p(k)$ of the power calculation circuit 23 and providing at a sample period earlier than the on sampler 21, a late sampler 25 operative at a sample period later than the on sampler 21 for receiving an output $m_p(k)$ of the power calculation circuit 23 and providing at a sampler period later than the on sampler 21, an adder 26 for adding a difference of outputs of the earlier sampler 24 and the late sampler 25, a low pass filter 27 for filtering outputs of the adder 26 to pass a low frequency portion only, and a digital control oscillator(DCO) 28 for receiving an output of the low pass filter 27, providing an early clock, a late clock, and a symbol clock, and driving the early sampler 24, the later sampler 25, the on sampler 21, and the demodulator 22 by means of respective clocks. The DCO 28 is provided with a general modulo accumulator.

The operation of the aforementioned closed-loop synchronizer will be explained with reference to FIG. 5.

Referring to FIG. 5a, the power calculation circuit 23 receives an output m(k) of the matched filter 20 and calculated a power of the PN code. A third symbol of the output signals $m_p(k)$ has a maximal power value lower than a reference value due to an external noise. Then, upon receiving the output $m_p(k)$ of the power calculation circuit 23, the early sampler 24 extracts a power signal earlier than the on sampler 21 and the late sampler extracts a power signal later than the on sampler 21. The adder 26 generates a signal of an output difference of the early sampler 24 and the late sampler 25 and provides the difference to the DCO 28 through the low pass filter 27. The DCO 28 accumulates the received output difference on a predetermined accumulation unit. FIG. 5b illustrates a change of value in a modulo accumulator in the DCO 28. As shown in a first symbol period in FIG. 5a, a time(a number of clocks) for obtaining a maximal value in the accumulator is prolonged in a case when an output difference of the early sampler and the late sampler is negative because the accumulation unit decreases as the output difference is subtracted from the basic accumulation unit, and for a second symbol period shown in FIG. 5a, a time for obtaining a maximal value in the accumulator is shortened in a case when an output difference of the early sampler 24 and the late sampler 25 is positive because the accumulation unit increases as the output difference is added to the basic accumulation unit. As shown in FIG. 5c, if a threshold value is set to an accumulator value to provide a clock every time the accumulator value exceeds the threshold value, three symbol timings of the early clock, the symbol clock, and the late clock are generated. And, the early clock and the late clock are adapted to drive the early sampler 24 and the late sampler 25 respectively, and the symbol clock timing is adapted to drive the on sampler 21 and the demodulator 22. Therefore, since a timing of the symbol clock can be set by detecting a state of a maximal value of the PN code from the matched filer 20 from timings of the early clock and the late clock before and after the symbol clock that is the driving timing of the on sampler, the related art closed-loop synchronizer can improve a BER performance better than the related art open-loop synchronizer.

In conclusion, through the aforementioned open-loop synchronizer of the timing recovery circuit is favorable in making a data transmission rate faster because the open-loop synchronizer has a simple system and no feedback component, the open-loop synchronizer has a disadvantage in that it has a low BER performance, whereas, though the related art closed-loop synchronizer can improve the BER performance, the closed-loop synchronizer has disadvantages in that the closed-loop synchronizer has a complicated system and feedback components, impeding application of a pipeline structure thereto for improving the data transmission rate. Moreover, the timing recovery circuit both of the open-loop synchronizer and the closed-loop synchronizer require a digital filter, which causes a problem in that a user is required to set an optimal pass band according to a channel ambient and carrier frequency(an offset) as the BER performance is dependent on the digital filter and the pass band, significantly.

SUMMARY OF THE INVENTION

Accordingly, the present invention is directed to circuit and method for timing recovery in a digital communication receiver that substantially obviates one or more of the problems due to limitations and disadvantages of the related art.

An object of the present invention is to provide circuit and method for timing recovery in a digital communication receiver which can improve a BER performance.

Another object of the present invention is to provide circuit and method for timing recovery in a digital communication receiver which has a significantly faster data transmission rate.

A further object of the present invention is to provide circuit and method for timing recovery in a digital communication receiver which requires no optimal pass band control.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the timing recovery circuit in a digital communication receiver for recovering a synchronous timing signal of a PN code from an output of a matched filter in the digital communication receiver, and the PN code received from a transmitter, includes a power calculation circuit for receiving an output of the matched filter and calculating a power of a PN code signal for each sample period in each symbol period, a maximal power position detection circuit for detecting a sample position at which a symbol period has a maximum power value, a symbol position tracking circuit for tracking and setting an optimal symbol position value, a modulo counter for rotating as many as a number of samples in one symbol period in counting the samples for providing a reference position of samples, and a comparator for comparing the present symbol position value from the symbol position tracking circuit with a count value from the modulo counter, and generating a symbol clock when the present symbol position value and the count value are the same.

In the other aspect of the present invention, there is provided a method for timing recovery in a digital communication receiver, for timing recovery for use in recovering a transmission data by synchronizing an output of a matched filter to a PN code phase from a transmitter, sampling, and demodulating the output, and the matched filter for receiving a transmission signal of the transmission data band spread by means of the PN code, digitizing, and matched filtering the transmission signal, including the steps of (1) providing a power value from the matched filter at each sample period (j) in each symbol period(i), (2) detecting a sample position of a maximal power in every symbol period from the provided power values $m_p(i,j)$, (3) comparing a maximal power sample position value $p_f(i)$ in the detected present symbol period and a symbol position value $p_s(i)$ used as a maximal power sample position in the present symbol period, and, on the same time, comparing a maximal power sample position value $p_f(i-n)$ (n is a natural number) before at least one symbol period and a maximal power sample position value $p_f(i)$ in the present symbol period, for renewing a symbol period position value $p_s(i+1)$ in the next symbol period to $p_f(i)$ when equations $p_f(i) \neq p_s(i)$ and $p_f(i) = p_f(i-n)$ are true and for maintaining a symbol position value $p_s(i+1)$ in the next symbol period the same as a symbol position value $p_s(i)$ in the present symbol period until the equations are not true, thereby tracking and setting a symbol position value, and (4) providing a symbol clock at the present symbol position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
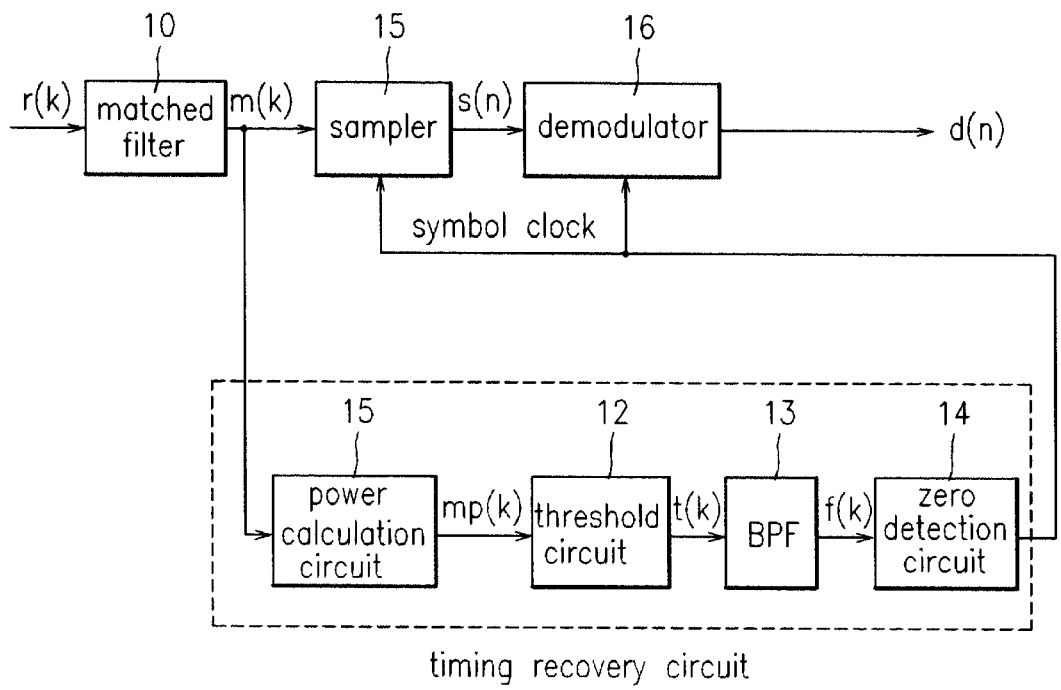
FIG. 1 illustrates a block diagram showing a related art symbol timing recovery circuit of an open-loop synchroniser type in a digital communication receiver.
Figure 2:
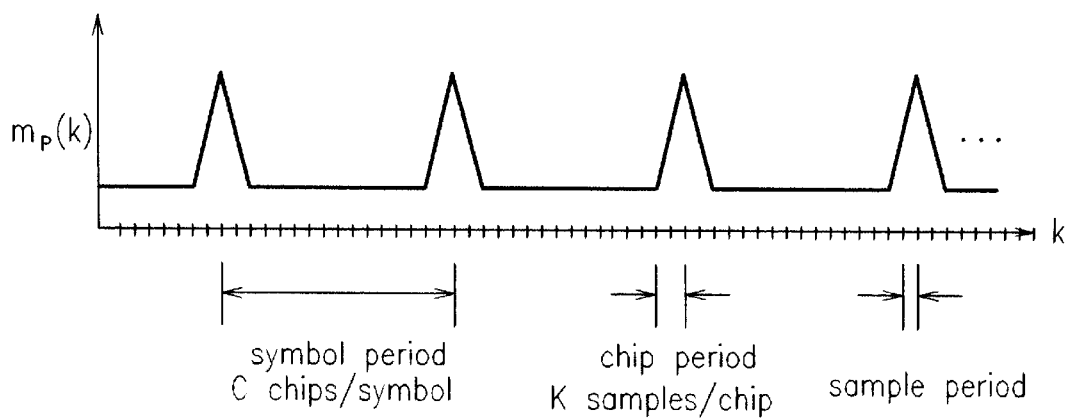
FIG. 2 illustrates an output of the matched filter when there is no noise.
Figure 3:
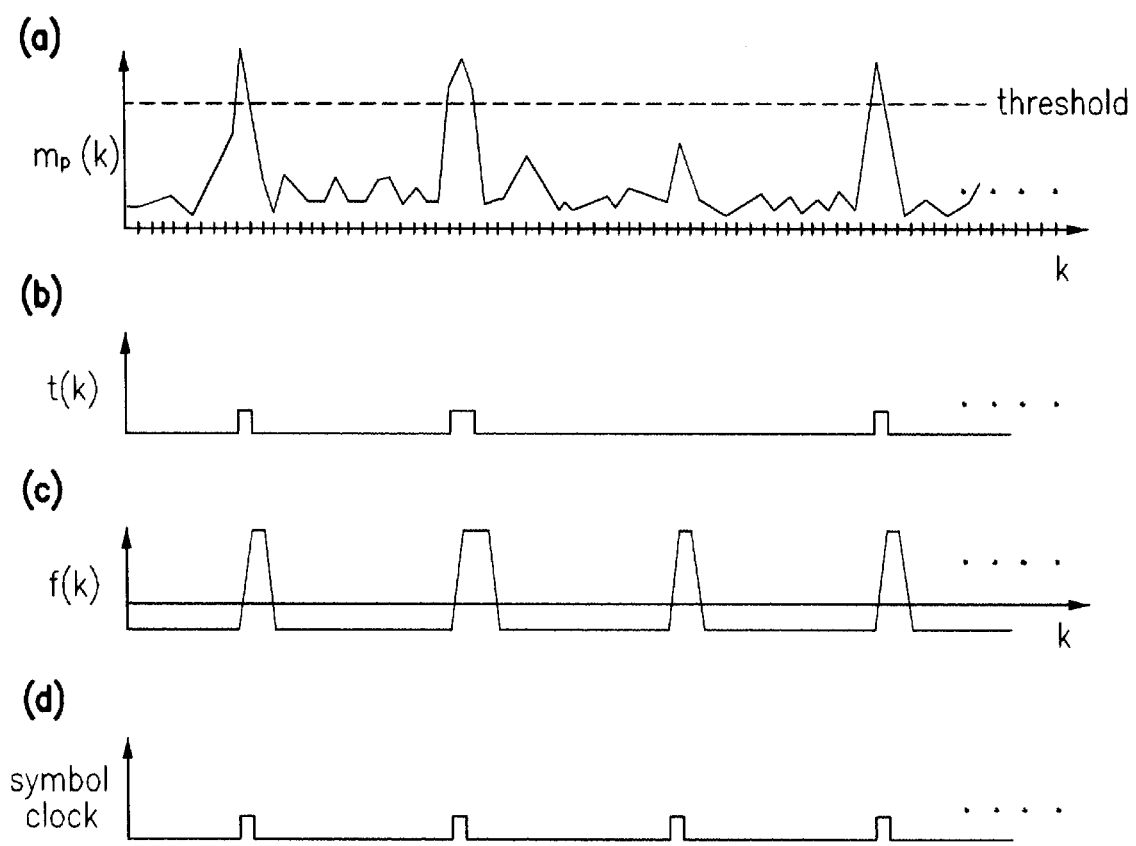
FIGS. 3a~3c illustrate waveforms of output signals of different units in the timing recovery circuit shown in FIG. 1.
Figure 4:
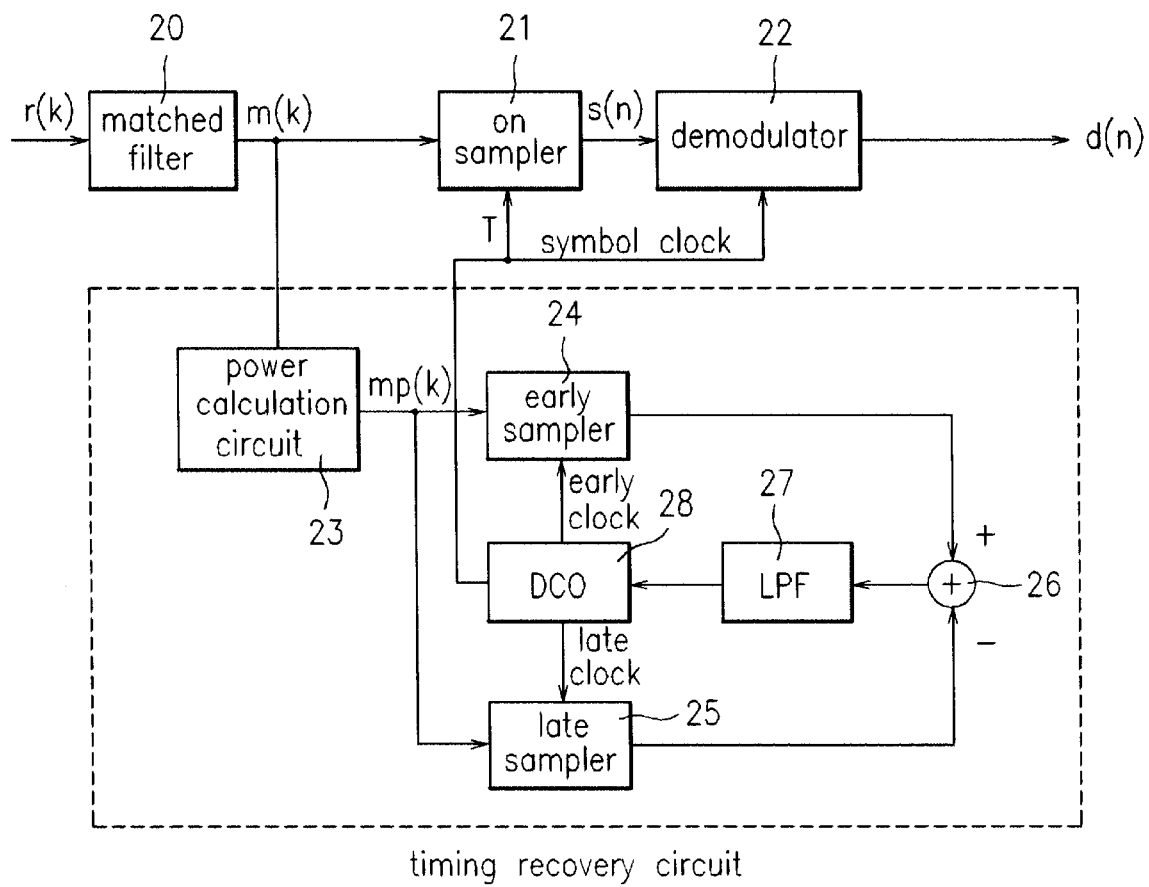
FIG. 4 illustrates a block diagram showing a related art timing recovery circuit of a closed-loop synchronizer type in a digital communication receiver.
Figure 5:
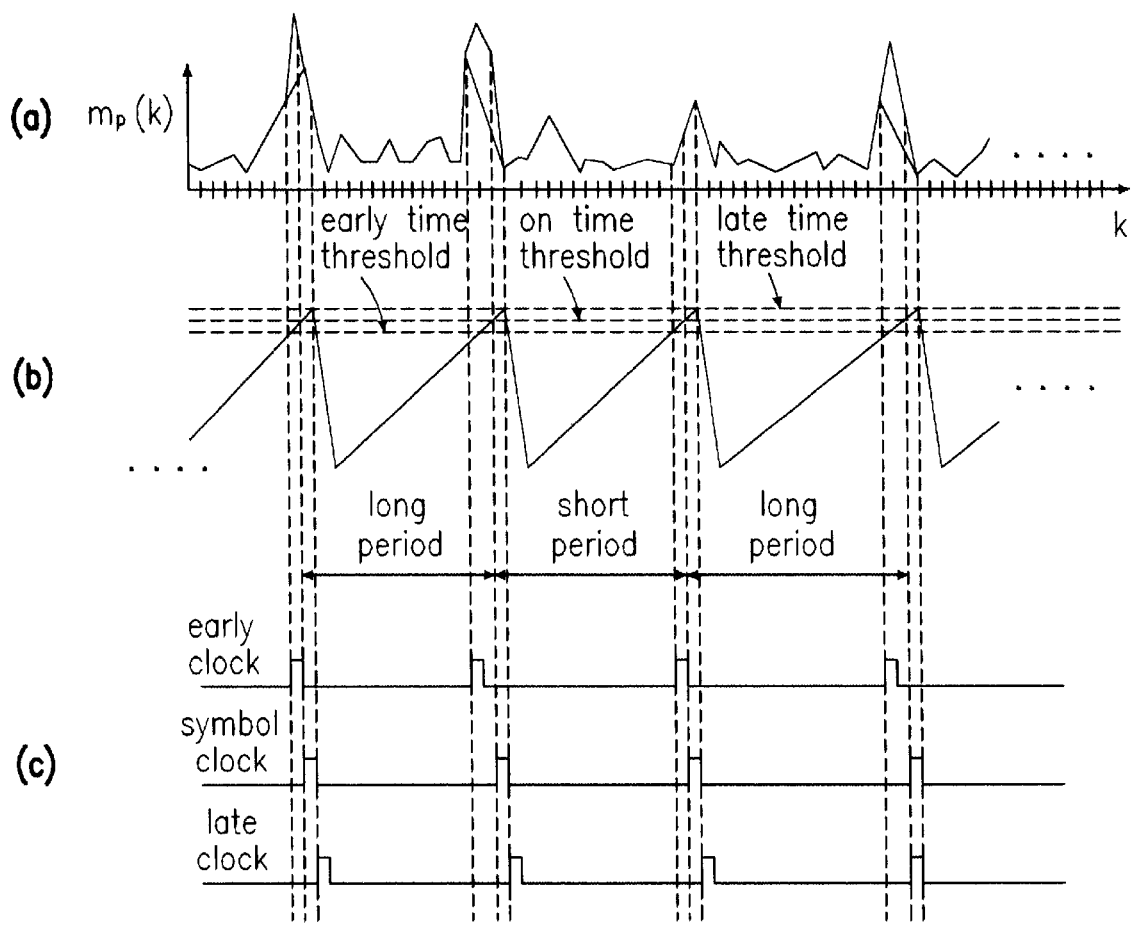
FIGS. 5a~5c illustrate waveforms of output signals of different units in the timing recovery circuit shown in FIG. 4.
Figure 6:
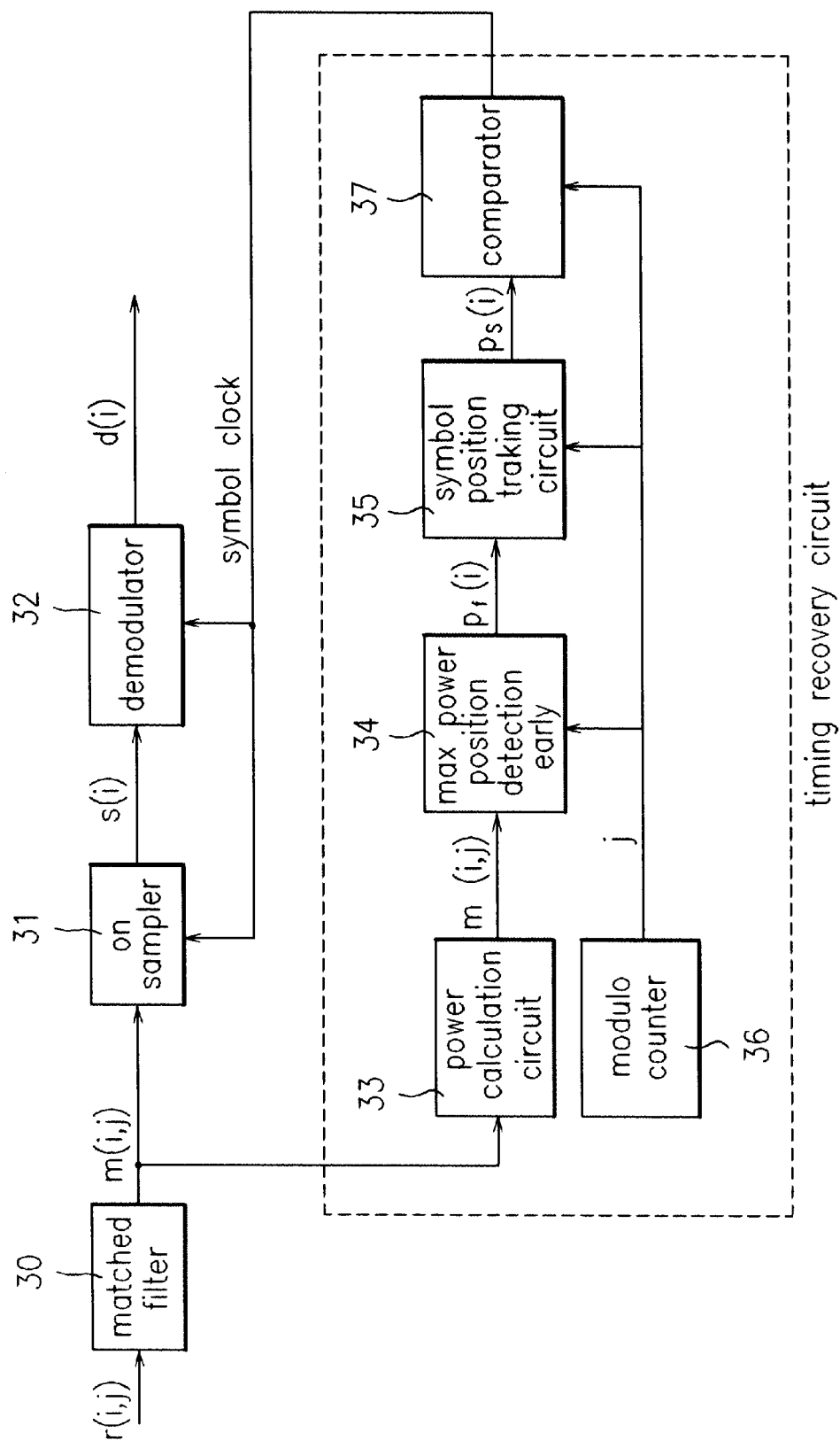
FIG. 6 schematically illustrates a block diagram of a timing recovery circuit in a digital communication receiver in accordance with a preferred embodiment of the present invention.

Reference will now be made in detail to the preferred embodiments of the present invention, examples of which are illustrated in the accompanying drawings. FIG. 6 schematically illustrates a block diagram of a timing recovery circuit in a digital communication receiver in accordance with a preferred embodiment of the present invention.

Referring to FIG. 6, a timing recovery circuit in a digital communication receiver in accordance with a preferred embodiment of the present invention, provided for recovering a synchronous timing of a PN code from a matched filter in the digital communication receiver and providing to a sampler 31 and a demodulator 32 in the digital communication receiver, includes a power calculation circuit 33 for receiving an output m(i, j) of the matched filter 30 and calculating a power of a PN code at every sample period j, a maximal power position detection circuit 34 for receiving an output $m_p(i, j)$ of the power calculation circuit 33 and detecting a position of a sample of a maximal power from samples received in one symbol period, a symbol position tracking circuit 35 for tracking an optimal symbol position based on outputs $p_f(i)$ of the maximal power position detection circuit 34, a modulo counter 36 for rotating as many as a sample number S per symbol in counting samples to provide a reference position of a sample period, and a comparator 37 for comparing the present symbol position $p_s(i)$ from the symbol position tracking circuit 35 with a count value j from the modulo counter 36 for use as a driving timing for the sampler 31 and the demodulator 32, wherein the power calculation circuit 33, the maximal power position detection circuit 34, and the comparator 37 are operative synchronous to clock of the sample, the symbol position tracking circuit 35 is operative at a zero count value of the modulo counter 36, and a reference sample position count value j from the modulo counter 36 is counted at every symbol clock from 0 to S−1 for setting a sample reference position.

Figure 7:
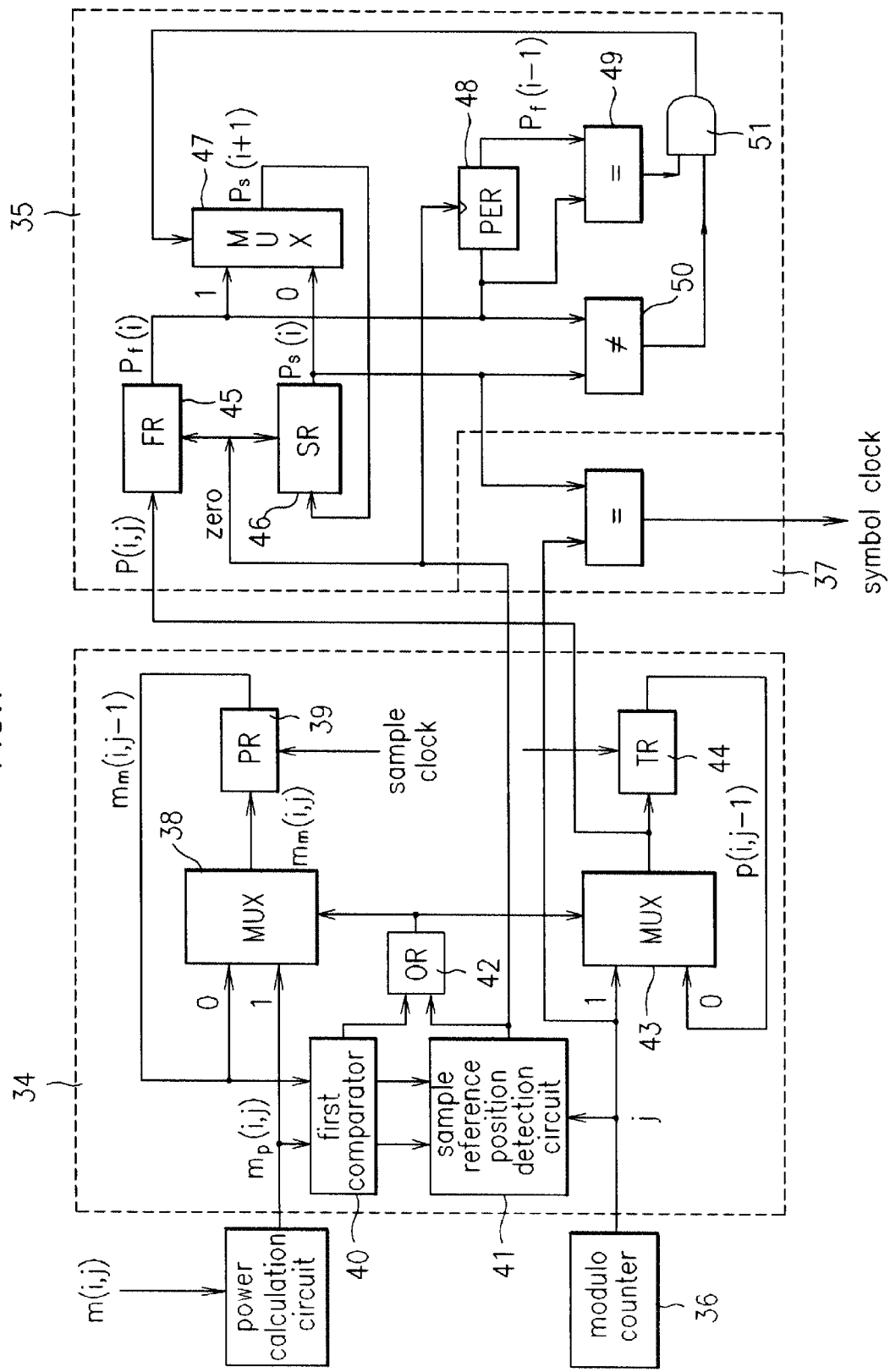
FIG. 7 illustrates a detail of a timing recover circuit in accordance with a preferred embodiment of the present invention.

FIG. 7 illustrates a detail of a timing recover circuit in accordance with a preferred embodiment of the present invention.

Referring to FIG. 7, the maximal power position detection circuit 34 includes a maximal power selection unit 38 having a multiplexer for selecting a maximal power value from power values $m_p(i, j)$ provided in a sample period j at every symbol period i from the power calculation circuit 33 and a maximal power value $m_m(i, j-1)$ provided up to a sample period before on sample period (j−1), a momentary maximal power storage register 39 for storing and forwarding an output of the maximal power selection unit 38 at every sample period, a first comparator 40 for comparing an output $m_p(i, j)$ of every sample period from the power calculation circuit 33 with the output $m_m(i, j-1)$ of the momentary maximal power storage register 39 to provide a high level signal where the output $m_p(i, j)$ is greater than the output $m_m(i, j-1)$, a sample reference position detection circuit 41 for detecting a zero point, a sample reference position, from every sample period from the modulo counter 30, an OR gate 42 for subjecting outputs of the first comparator 40 and the sample reference position detection circuit 41 to a logical sum, a maximal power position selection unit 43 for selecting a sample period position of a maximal power in every symbol period, and a momentary maximal power position storage register 44 for storing an output p(i, j) of the maximal power position selection unit 43 and forwarding at the next sample period, wherein the maximal power selection unit 38 and the maximal power position selection unit 43 are adapted to be operative synchronous to an output of the OR gate 42, for selecting the output $m_p(i, j)$ and the reference count j in place of an existing storage value every time an output of the OR gate is transited to a high level. And, the momentary maximal power storage register 39 and the momentary maximal power position storage register 44 are adapted to be driven in response to the sample period clock.

The symbol position tracking circuit 35 includes a symbol period maximal power position storage register 45 for receiving a momentary maximal power sample position in every symbol period from the maximal power position detection circuit 34 for storing a sample position of a maximal power in every symbol period, a symbol position storage register 46 for storing a sample position selected and used in the present symbol period(hereafter, called as a symbol position simply), a symbol position selection unit 47 for selecting a symbol position, a one symbol period prior maximal power position storage register 48 for storing a position of a one symbol period prior maximal power, a second comparator 49 for comparing a maximal power position within the present symbol period and a maximal power position before one symbol period and providing a high level if found identical, a third comparator 50 for comparing a sample position used as the present symbol position and a sample position of a maximal power within the present symbol and providing a high level signal if found not identical, and an AND gate 51 for subjecting outputs of the second comparator 49 and the third comparator 50 to logical production, wherein the symbol period maximal power position storage register 45, the symbol position storage register 46, and the one symbol period prior maximal power position storage register 48 are connected to be driven in response to the sample reference position detection circuit 41 in the maximal power position detection circuit 34, the symbol position selection unit 47 has multiplexer connected to be driven in response to an output of the AND gate 51. The comparator 37 compares a count value from the modulo counter 36 and a sample position used as the present symbol position, and provides a symbol clock if found identical.

Figure 8:
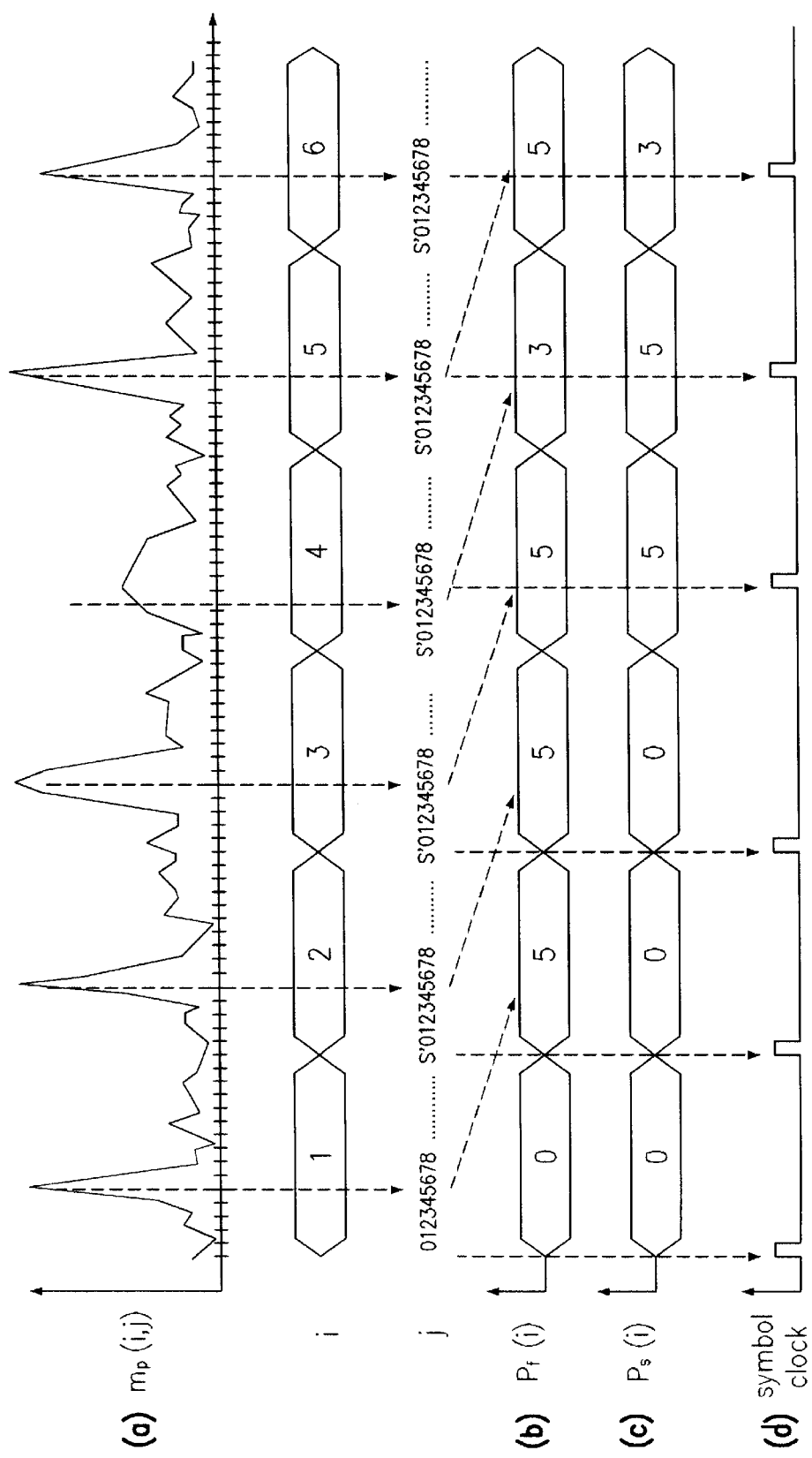
FIGS. 8a~8d illustrate output signals of different units in a timing recovery circuit of the present invention.

The operation of the aforementioned embodiment of the present invention will be explained in detail with reference to FIGS. 6~8d. FIGS. 8a~8d illustrate output signals of different units in a timing recovery circuit of the present invention shown in FIG. 7, wherein the power calculation circuit 33 receives an output m(i, j) of the matched filter 30 at each sample period in each symbol period, calculates a power of the output m(i, j), and forward an output $m_p(i, j)$ as shown in FIG. 8a. The first comparator 40 in the maximal power position detection circuit 34 compares a maximal power $m_m(i, j-1)$ before one sample period stored in the momentary maximal power storage register 39 and the output $m_p(i, j)$, and provides a high level signal if the output $m_p(i, j)$ is greater than the output $m_m(i, j-1)$. The high level signal drives the maximal power selection unit 38 through the OR gate 42 so that the maximal power selection unit 38 selects the $m_p(i, j)$ and stores in the momentary maximal power storage register 39. An output of the OR gate 42 drives the maximal power position selection unit 43 so that the maximal power position selection unit 43 selects a sample position j from the modulo counter 36 at a moment the output $m_p(i, j)$ is selected, and stores in the momentary maximal power position storage register 44. On the other hand, when a count value within one period from the modulo counter 36 is a first sample position in each symbol period, the reference sample position detection circuit 41 also provides pulses, and drives the maximal power selection unit 38 and the maximal power position selection unit 43 through the OR gate 42 so that the maximal power selection unit 38 and the maximal power position selection unit 43 respectively select the output $m_p(i, j)$ of the power calculation circuit 33 and a sample position j from the modulo counter 36 and store in respective registers 39 and 40, thereby renewing data stored in the storage registers 39 and 44 at every symbol period. The symbol position tracking circuit 35 stores a maximal power position value $p_f(i)$ in a symbol period from the maximal power position detection circuit 34 in the symbol period maximal power position storage register 45 every time a first sample position j=0 in each symbol period from the modulo counter 36 arrives. And, the symbol position tracking circuit 35 compares a maximal power position value $p_f(i-1)$ before one symbol period and the present maximal power position $p_f(i)$ by means of the second comparator 49 at every first sample position j=0, and provides a high level pulse if found in agreement, compares a maximal power position value $p_f(i)$ from the symbol period maximal power position storage register 45 and a symbol position value $p_s(i)$ from the symbol position storage register 46 by means of the third comparator 50, and provides a high level pulse if found not identical, and drives the symbol position selection unit 47 by means of the AND gate 51, which subjects outputs of the second, and third comparators 49 and 50 to logical sum, when outputs of the second, and third comparators 49 and 50 are high levels on the same time, so that a maximal power position value $p_f(i)$ within a symbol period from the symbol period maximal power position storage register 45 is renewed and stored in the symbol position storage register 46. That is, referring to FIGS. 8a~8c, a sample position j of a maximal power value being 5 in a first symbol period i=1, and a maximal power position value $p_f(2)$ renewed at the present time in a second symbol period i=2 being 5, since the maximal power position value $p_f(2)$ of 5 is different, not only from the present symbol position value $p_s(2)$ of 0, but also from the maximal power position value before one period $p_f(0)$ of 0, the next symbol position value $p_s(3)$ of 0 is maintained. In a third symbol period(i=3), since a sample position of maximal power also being 5 and the present maximal power position value $p_f(3)$ being 5 which is different from the zero of the position value $p_s(3)$, but is identical to the maximal power position value $p_f(2)$ before one period, a $p_s(4)$ in the next symbol period (i=4) is renewed to 5 and maintained until the maximal power sample position is changed due to a noise. That is, if the present maximal power position value $p_f(i)$ is identical to a maximal power position value $p_f(j-1)$ before one period, and the present symbol position value $p_s(i)$ is not identical to the present maximal power position value $p_f(2)$, the next symbol position value $p_s(i+1)$ is renewed to the present maximal power position value $p_f(i)$, beside of these cases, a symbol position value before one period is maintained as it was. And, since the maximal value falls on $m_p(4, 3)$ in a fourth symbol period (i=4) due to an influence from a noise that causes an irregular symbol position change, with a maximal power position value $p_f(5)$ of 3 identical in a fifth symbol period(i=5), which is different from the present sample position value $p_s(5)$=5, and is also different from the maximal power position value before on period $p_f(4)$, a symbol position value $p_s(6)$ in the next symbol period is not renewed. Accordingly, even if there is a continued noise occurred, the symbol position is not changed if no maximal power values are detected two or more than two times at the same sample position. Thus, in the present invention, once a symbol position is fixed, changes of the maximal power sample position caused by noise is not traced one by one because, as a result of simulation by the inventor, it is verified that the BER performance of the present invention is excellent than a case when the changes of symbol position are traced one by one. Upon fixing the sample position, the comparator 37 compares a sample value at the present symbol position and the sample value j counted in the modulo counter, to provide a symbol clock if identical, for use as driving timings for the sampler 31 and the demodulator 32.

FIGS. 9a~9d illustrate signals from different units when a clock offset is occurred, showing a case when only clock offsets are present without noise for simplicity of explanation.

Figure 9:
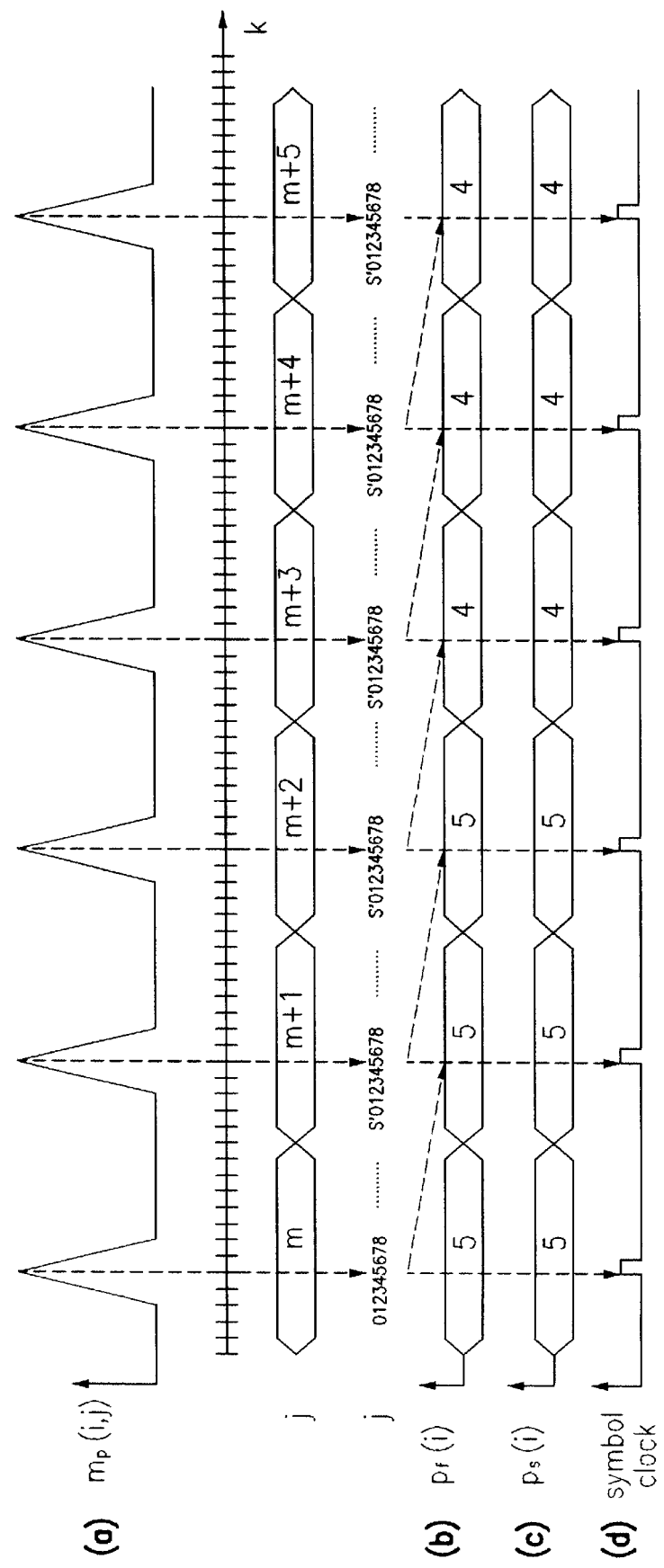
FIGS. 9a~9d illustrate signals from different units when a clock offset is occurred.

Referring to FIG. 9a, even if there is no noise, the maximal power sample position advances forward as time goes by in the receiver when a clock frequency at a transmitter is greater than a clock frequency at a receiver or a distance between the transmitter and the receiver becomes shorter. In this instance, the greater a clock offset, the faster the advance, and vice versa. For example, if the clock offset is 1%, the symbol position advances at every 100/S(S is a number of sample) symbols. That is, the maximal power sample position advances by one sample period up to 100/S sample. Then, the maximal power sample position is maintained to be at the same position until pass of 100/S symbols when the maximal power sample position advances by one sample period, again. Therefore, different from the symbol position due to noise, the symbol position due to the clock offset is maintained for (clock offset×S)$^{-1}$(>>2) symbol periods continuously after the symbol position is changed once, which is reflected to a symbol position value $p_s(i)$ by the symbol tracking circuit 35. Referring to FIGS. 9a~9d, illustrating a case when, though samples each having a maximal power value at count 5 are received until (m+1)th symbols, samples each having a maximal power value at count 4, one sample period earlier than before, are received starting from (m+2)th symbols. In this instance, since the maximal power position value $p_f(m+3)$ of 4 is different from the symbol position value $p_s(m+3)$ of 5 as well as the maximal power position value before one symbol period $p_f(m+2)$ of 5, the symbol position value $p_s(m+4)$ at the next period is not renewed to 4 in the same reason as the aforementioned case of noise. However, since the maximal power position value $p_f(m+4)$ in (m+4)th symbol period of 4 is different from a symbol position value $p_s(m+4)$ of 4 and identical to a maximal power position value before one symbol period $p_f(m+3)$ of 4, a symbol position value in the next symbol period $p_s(m+5)$ is renewed to 4. Thus, a tracking reference of a symbol position change caused by a clock offset is determined whether the position changes are detected for two times in succession. This simple reference for a symbol position tracking is excellent compared to the related art reference in which both noise and clock offset are present. Once a $p_s(i)$ is determined, a count value from the modulo counter 36 and $p_s(i)$ is compared at the comparator 37, to provide a symbol clock when identical, for use as driving timings for the sampler 31 and the demodulator 32. At the end, the clock offset causes that a period from the modulo counter predicted at the receiver is not in agreement with a symbol clock period used in the transmitter. If a symbol clock period at the transmitter is shorter, there can be a case when two symbol values are received at count values of 0 and S-1 within one period from the modulo counter in the receiver, and, opposite to this, if the symbol clock period at the transmitter is longer, there can be a case when none of symbol is received within one period from the modulo counter. This problem may results in lost of one symbol in the former case and an arbitrary provision of one symbol in the receiver in the latter case. Therefore, the present invention additionally includes a system in which a phase of counter is controlled such that, when a symbol position is detected to be either 0 or S-1, the 0 or S-1 is changed to S/2 so that the position is detected at a middle value of the counter, forcibly.

Figure 11:
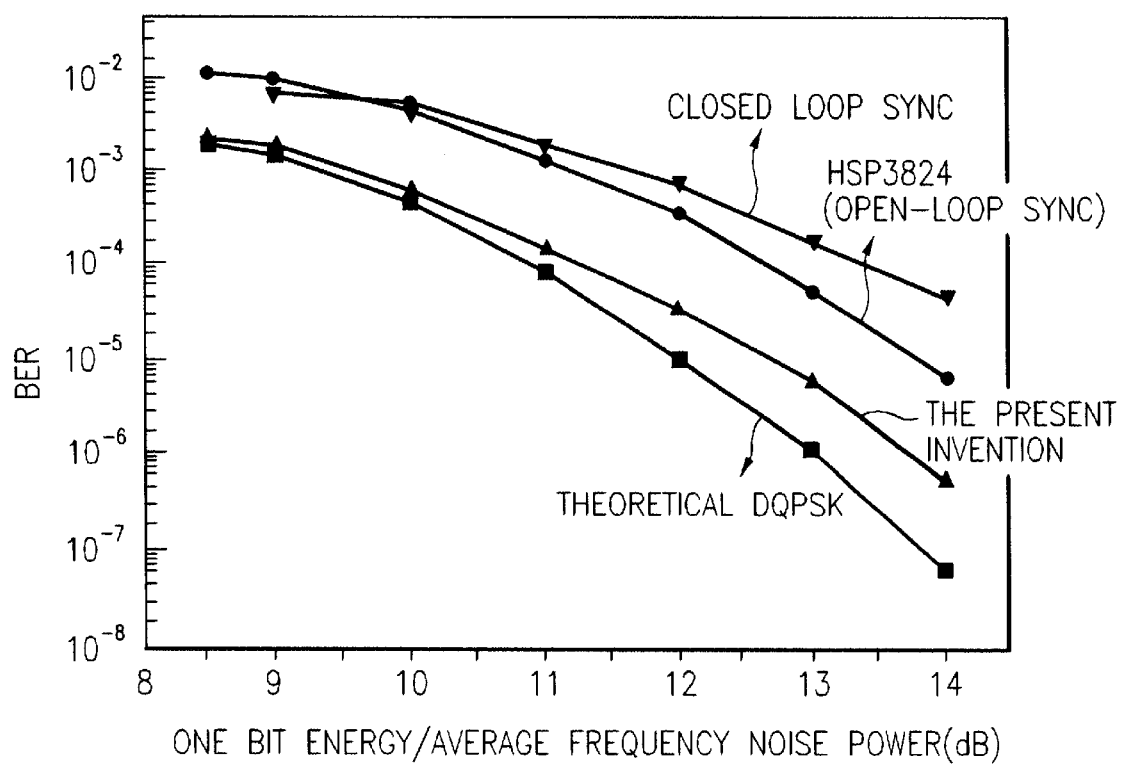

Referring to FIG. 11, a result of simulation of the aforementioned timing recovery circuit of a baseband modem application, which modem conducts a DSSS type non-coherent DPSK(Differential Phase Shift Keing) demodulation, shows excellent BER performance, and data transmission rate in an ambient of white noises and clock offsets compared to the related art. A related art modem used as a comparison is HSP3824 which is a model provided for the simulation of the present invention with the timing recovery circuit therein replaced with the related art closed-loop synchronizer or open-loop synchronizer, for use in conducting a coherent DPSK. As a result, it is found that the timing recovery circuit of the present invention can achieve a performance improvement more than approx. 2dB over the related art closed-loop synchronizer, and more than 1dB over the HSP3824.

Figure 10:
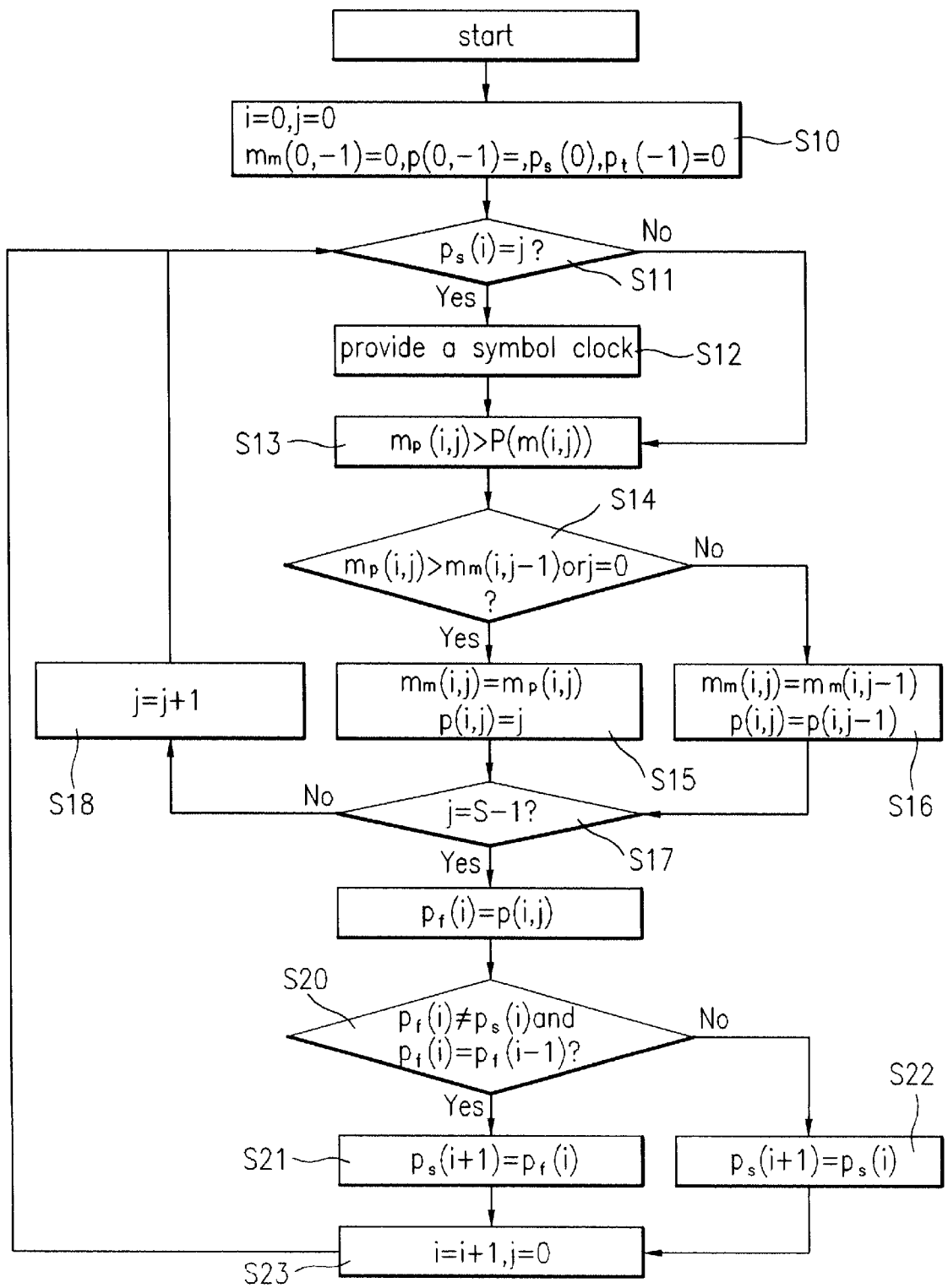
FIG. 10 illustrates a flow chart for implementing a method for timing recovery in accordance with a preferred embodiment of the present invention; and, FIG. 11 illustrates a graph showing performances of the present invention and the related art.

A method for timing recovery in a digital communication receiver in accordance with a preferred embodiment of the present invention will be explained, with reference to the attached drawings. FIG. 10 illustrates a flow chart for implementing the method for timing recovery in accordance with a preferred embodiment of the present invention.

Referring to FIG. 10, the method for timing recovery in a digital communication receiver starts with initializing data $m_m(0, -1)$, $p(0, -1)$, $p_s(0)$, and $p_f(-1)$, respectively stored in the momentary maximal power storage register 39, the momentary maximal power position storage register 44, the symbol position storage register 46, and the one symbol period prior maximal power position storage register 48, to 0 in step S10. The present symbol position value $p_s(i)$ is determined of being in agreement with a count value j from the modulo counter 36 in step S11, to routine to step S13 if found not in agreement, and to routine to S12 if found in agreement, to provide a symbol clock used as driving timing for the sampler 31 and the demodulator 32 in the step S12. A power of a signal m(i, j) from the matched filter 30 is calculated in the power calculation circuit 33 to provide a signal $m_p(i, j)$ in step S13. The power signal $m_p(i, j)$ is compared to a maximal power before on sample period $m_m(i, j-1)$ in a step S14, to provide a high level signal from the first comparator 40 if the power signal $m_p(i, j)$ found greater, and, if the counted value j from the modulo counter 36 is detected to be 0, a high level signal is provided from the reference sample position detection circuit 41, which high level signals respectively drives the maximal power selection unit 38 and the maximal power position unit 43 through the OR gate 42, to select and store, in a step S15, a power value $m_p(i, j)$ in the momentary maximal power storage register 39 and to store a sample value j of this moment provided from the modulo counter 26 in the symbol period maximal power position storage register 44. Accordingly, the momentary maximal power position storage register 44 is in storage of a sample position of a maximal power value within on symbol or a sample position to be renewed at j=0, which is a reference sample position in every symbol. On the other hand, when the power value $m_p(i, j)$ is smaller than the maximal power before one period $m_m(i, j-1)$ or when the counted value j from the modulo counter 36 is not zero in a step S14, the maximal power $m_m(i, j)$ is selected to be the maximal power before one sample period $m_m(i, j-1)$, the maximal power position value p(i, j) is also selected to be the maximal power position value before one period p(i, j-1), and they are respectively stored in the momentary maximal power storage register 39 and the momentary maximal power position storage register 44 in a step S16. Then, count value from the modulo counter 30 is determined of being a last sample value S-1 of a symbol period in question, to routine to S11, if determined not, and, as has been explained, to repeat until the last sample value S-1 is reached in a step S17. And, if the count value from the modulo counter 30 is the last sample value S-1, a sample position $p_f(i)$ of a maximal power value within a symbol period(i) from the maximal power position detection circuit 34 is stored in the maximal power position storage register 45 in a step S19. Next, in a step S20, a maximal power position value $p_f(i)$ within one symbol period from the symbol period maximal power position storage register 45 is determined both of being not identical to the present symbol position value $p_s(i)$ and identical to a maximal power position value before one symbol period $p_f(i-1)$ at the second comparator 49 and the third comparator 50, respectively. If it is determined to be 'yes', the next symbol position value $p_s(i+1)$ is selected to be the present maximal power position value $p_f(i)$, of which result is stored in the symbol position storage register 46 in step S21. On the other hand, If it is determined to be 'no' in the step S20, the next symbol position value $p_s(i+1)$ is maintained to be $p_s(i)$ in a step S22. In the next step S23, after a sample period j in the modulo counter 36 is set to be zero and a symbol period is raised by one in the modulo counter 36, to renew to the next symbol period, the process routines to the step S11 to repeat the aforementioned process, to provide a symbol clock at every sample position of a maximal power value within a symbol, thereby providing driving timings for the sampler 31 and the demodulator 32 so that PN codes at the receiver and the transmitter are synchronized. Though the embodiment of the present invention is designed to compare the present maximal power position value and a maximal power position value before one symbol period, the present invention is not limited to this, and may be designed that the present maximal power position value may be compared to a maximal power position value at least before one symbol period.

As has been explained, since no digital filter is required, the present invention has a simple system and requires no pass band control, and, since no feed back system is required, an application of a pipeline system which is favorable for improving a symbol transmission rate significantly is allowed, and an excellent BER performance can be obtained.

It will be apparent to those skilled in the art that various modifications and variations can be made in the circuit and method for timing recovery in a digital communication receiver of the present invention without departing from the spirit or scope of the invention. Thus, it is intended that the present invention cover the modifications and variations of this invention provided they come within the scope of the appended claims and their equivalents.

What is claimed is:

1. A timing recovery circuit in a digital communication receiver, which recovers a synchronous timing singnal of a PN code from an output of a matched filter in the digital communication receiver and provides actuation clocks for a sampler and a demodulator of the digital communication receiver, comprising:

a power calculation circuit that receives an output of said matched filter, calculates the power of a PN code signal for each sample period in each symbol period, and outputs it to produce a symbol clock by calculating the power of an output of said matched filter for each sample period in each symbol period and tracking a maximal power position;

a maximal power position detection circuit that detects a sample position at which a maximum power value is obtained in a symbol period by using the output values, which are power values calculated for sample periods in each symbol period, of said power calculation circuit;

a symbol position tracking circuit that tracks and sets an optimal symbol position by using the maximal power position detected by said maximal power position detection circuit;

a modulo counter that counts the number of samples by rotating as many as the number of samples in each symbol period, providing a reference position to generate a symbol clock, by using the optimal symbol position tracking value tracked by said symbol position tracking circuit; and a comparison circuit that compares the optimal symbol position tracking value tracked by said symbol position tracking circuit and the counter value of said modulo counter, and generates a symbol clock for actuating a sampler and a demolulator when said optimal symbol position tracking value and said counter value are the same.

2. A timing recovery circuit in a digital communication receiver as claimed in claim 1, wherein said maximal power position detection circuit comprises:

a first comparator that compares an output power of said power calculation circuit and a power in one sample period before, and selects the larger one between the two;

a reference sample position detection circuit that detects a reference sample position from a counter output value of said modulo counter and outputs said reference sample position;

an OR gate circuit that produces a new maximal power sample position selecting signal by using a selected power output of said first comparator and a reference position output of said reference sample position detection circuit;

a maximal power selection unit that selects the maximum value among the output of said power calculation circuit and the maximum power in one sample period before, by using a maximal power sample position selecting signal of said OR gate circuit, and outputs said maximum value;

a momentary maximal power storage register that stores a momentary maximal power of said maximal power selection unit;

a maximal power position selection unit that selects a maximal power sample position among the counter value of said modulo counter and the maximum power sample position in one sample period before, by using said maximal power sample position selecting signal; and a momentary maximal power position storage register that stores a maximal power sample position value of said maximal power position selection unit.

3. A timing recovery circuit in a digital communication receiver as claimed in claim 2 characterized in that:

each of said maximal power selection unit and said maximal power position selection unit comprises multiplexer (MUX); and a reference sample position obtained by said modulo counter, that counts by rotating as many as the number of samples on each symbol period, is the first (j=0) sample position in each symbol period.

4. A timing recovery circuit in a digital communication receiver as claimed in claim 1, wherein said symbol position tracking circuit comprises:

a symbol period maximal power position storage register that receives a momentary maximal power sample position in each symbol period from said power calculation circuit and stores said momentary maximal power sample position;

a symbol position storage register that stores a symbol position, which is a sample position selected by said power calculation circuit in the present symbol period and used therein;

a symbol position selection unit that selects a value to be used as a symbol position among an output of said symbol period maximal power position storage register and an output of said symbol position storage register;

a second comparator that compares an output of said maximal power position storage register and an output of said symbol position storage register, and thereby produces a signal for generating a symbol position selection unit control signal;

a third comparator that compares an output of said maximal power position storage register and an output of a register which stores a maximal power position in at least one symbol period before, and thereby produces a signal for generating a symbol position selection unit control signal;

an AND gate that receives output signals from said second comparator and said third comparator and generates a symbol position selection unit control signal; and a comparison circuit that compares the value of said symbol position selection register and the counter value of said modulo counter, that counts by rotating as many as the number of samples in each symbol period, and generates a symbol clock when the values are the same.

5. A timing recovery circuit in a digital communication receiver as claimed in claim 4 characterized in that:

said second comparator outputs a high level signal when a maximal power position in the present symbol period, which is the output of said symbol period maximal power position storage register, is in agreement with a maximal power position in at least one symbol period before, which is the output of said maximal power position storage register in the prior symbol period;

said third comparator outputs a high level signal when a maximal power sample position in the present symbol period, which is the output of said symbol position storage register, is different from a sample position used as a sampling position in the present symbol, which is the output of said modulo counter that counts by rotating as many as the number of samples in each symbol period; and said second comparator and said third comparator are connected such that said high level signal outputs actuate said symbol position selection unit through said AND gate.

6. A method for timing recovery in a digital communication receiver, which receives a transmission data band spread by means of a PN code, digitizes said transmission signal, synchronizes an output of a matched filter to a PN code phase from a transmitter, and recovers a transmission data by sampling and demodulating the output of said matched filter, comprising the steps of:

calculating a power in each symbol sample period (j) of each symbol (i) by using an output of said matched filter and outputting the power;

detecting a position of sample having a maximum power among the samples in a symbol for each symbol period by using said calculated output powers;

tracking and setting a symbol position value by
(a) comparing a detected maximal power sample position value, pf(i), in the present symbol(i) and a symbol position value, ps(i), which is used as a maximal power sample position in a sampling step of the present symbol,
(b) comparing a maximal power sample position value, pf(i−n) (here, n is a natural number greater than 1), in a symbol of at least one symbol period before a maximal power sample position value, pf(i), in the present symbol,
(c) when pf(i) is different from ps(i), and pf(i) and pf(i−n) are the same, replacing the symbol position value, ps(i+1), which is to be used as maximal power sample position in the next sample position in the next symbol sampling, by pf(i), and
(d) otherwise, maintaining the symbol position value, ps(i+1), which is to be used as maximal power sample position in the next symbol sampling, with a symbol position value, ps(i), which is used as maximal power sample position in the present symbol sampling; and generating a symbol clock at a maximal power sample position by using a symbol position value obtained by said tracking.

* * * * *